United States Patent [19]

Widener

[11] Patent Number: 4,688,027
[45] Date of Patent: Aug. 18, 1987

[54] ISOLATED MOLDED SENSOR STRIP

[76] Inventor: M. W. Widener, 703 Westbrook Dr., Austin, Tex. 78746

[21] Appl. No.: 794,714

[22] Filed: Nov. 4, 1985

[51] Int. Cl.[4] ............... G08B 21/00; H01H 29/00
[52] U.S. Cl. .................. 340/604; 200/61.05; 340/573
[58] Field of Search ............. 200/61.04, 61.05, 264; 338/34, 35; 128/138 R, 138 A; 340/573, 603, 604

[56] References Cited

U.S. PATENT DOCUMENTS

| 2,644,050 | 6/1953 | Seiger | 200/61.05 |
| 3,778,570 | 12/1973 | Shuman | 200/61.05 |
| 3,879,586 | 4/1975 | DuRocher et al. | 200/5 A |
| 4,069,817 | 1/1978 | Fenole | 200/61.05 X |
| 4,297,686 | 10/1981 | Tom | 200/61.05 X |

FOREIGN PATENT DOCUMENTS 236255  11/1961  Australia ............... 128/138 A

Primary Examiner—J. R. Scott
Attorney, Agent, or Firm—J. Nevin Shaffer, Jr.

[57] ABSTRACT

A moisture sensing system for sensing the presence of moisture, with a molded yoke and opening which assures positive separation of electronic connections, with non-metalic conductors composed of electrically conductive plastic. Isolating resistors are provided so that the sensor strip may be safely used without fear of electrical shock from inadvertant feedback.

4 Claims, 8 Drawing Figures

ISOLATED MOLDED SENSOR STRIP

BACKGROUND OF THE INVENTION

This invention relates to an improved moisture detecting device.

A wide variety of moisture detecting devices have been known in the art for quite some time. For example, enuresis bedpads have been designed with thin, metal, current conducting, sensor strips bonded to one surface of a sheet-like, essentially non stretchable, relatively flexible and electrically insulative substrat. An example of such a bedpad is disclosed in Shuman U.S. Pat. No. 3,778,570 which is designed to be fabricated in large rolls and then cut into appropriate lengths. The metal sensor strips are electrically insulated from each other by the substrat itself. Sensor tapes are also known in the art as exemplified by Tom U.S. Pat. No. 4,297,686. The Tom patent discloses a water detection device comprised of a flexible plastic tape with an adhesive backing and having a surface which contains a pair of conductive metal strips. The usual design of moisture sensing devices is represented by a pair of metal screens with replaceable padding between them. Further, some designs involve dissimilar metal such as aluminum and copper used as a generator of feeble electric currents to be detected by associated detector circuits. Still other inventions relate to a pad with numerous parallel but separate wires intermeshed so that moisture will form a conductive path between two wire grids.

Each of these previous devices have common defects in that they are composed of fragile metal wires which break with extended use and which may cause injury to the user who comes in contact with a broken strand of wire, cleaning them is quite difficult, replacement of padding is inconvenient, and the sensing device itself is usually uncomfortable. In addition, there is a general deterioration of most systems due to chemical corrosion by the electrolyte which comes in contact with the metal wires in the grid. A further major defect in previous devices is that once the electrolyte comes in contact with the sensing wires, removing the electrolyte completely and restoring the system to its detecting state is extremely difficult. Even removing and completely drying previous devices leaves some amount of electrolytic residue on the sensing wires so that after repeated use, previous devices suffer a gradual yet continual deterioration of performance. Thus, there is a need in the art for providing a moisture sensing means which avoids the hazards associated with the rapid deterioration of wire systems, which is easily located in the normal bedding already in use and which is flexible and small enough so that it cannot be a source of discomfort, while at the same time being capable of complete and easy cleaning. It, therefore, is an object of this invention to provide an improved moisture sensing device which is thin and flexible enough so that it may be located in normal bedding already in use without becoming a source of discomfort.

It is another objective of this invention to provide a sealed plastic device that uses non-metallic conductors and that is easily cleaned and dried for immediate reuse.

Yet another object of this invention is to provide electrical conductivity between two parallel non-metallic conductors in the presence of an electrolyte and yet provide complete chemical isolation between the conductors and the external environment.

It is still another object of this invention to provide a simple, sure means of attaching the device to ordinary bedding so that proper control of the position of the device in the probable wet area is provided.

It is yet another object of this invention to provide a moisture sensing strip for sensing of liquid levels in storage tanks.

It is yet another object of this invention to provide a sensing strip for sensing the presence of water or other electrolyte that might be spilled on a floor.

SHORT STATEMENT OF THE INVENTION

Accordingly, the instant invention is responsive to these needs by the provision of a moisture sensing strip of any desired length which is made of a non conductive flexible material such as plastic, which is provided with two parallel grooves which run the length of the strip. A pair of non-metallic conductors are provided which are made of an electrically conductive plastic such as occurs when plastic is made with carbon particles. The two non-metallic conductors are then physically installed into the formed grooves in the surface of the sensor strip. Thereafter, heat and pressure are applied to form a smooth solid seal on the surface of the sensor strip which has no grooves or joints that might entrap moisture or electrolyte. One end is provided with a molded yoke whereby the joint between the yoke and the sensor strip containing the parallel non-metallic conductors does not have a continuous conducting path. This condition is provided by means of creating a hole in the yoke that forces the joint between the yoke and the strip to be broken into two separate loops having no common connection where fluid can be trapped and form a non cleanable continuous pathway for current. The presence of the hole assures that the only pathway for current is over either the plastic insulating sensor strip itself or the smooth surface of the molded yoke. Because these surfaces are easily cleaned and dried, restoration of the insulated integrity of the sensor to its detecting condition by removing any path of conductivity is easily accomplished. Because the non-metallic conductors are totally enclosed and protected from the environment, the problems of deposition of electrolytic residue, deterioration as a result of constant exposure to electrolytes, or breakage of wire strands are avoided.

Additionaly, the yoke junction is provided with two large value resistors to give a significant safety advantage in the event of misuse or accident.

Further, the yoke end of the sensor strip is connected to a shielded cable which has an electronic transmission plug at one end so that transmission of the resistance condition detected by the sensor strip may be made to a sensing device, known in the art, which makes up no part of this invention.

BRIEF DESCRIPTION OF THE DRAWINGS

Other objects, features and advantages of the present invention will become more fully apparrent from the following detailed description of the preferred embodiment, the appended claims and the accompanying drawings in which:

DETAILED DESCRIPTION OF THE PREFERRED EMBODIMENT

Figure 1:
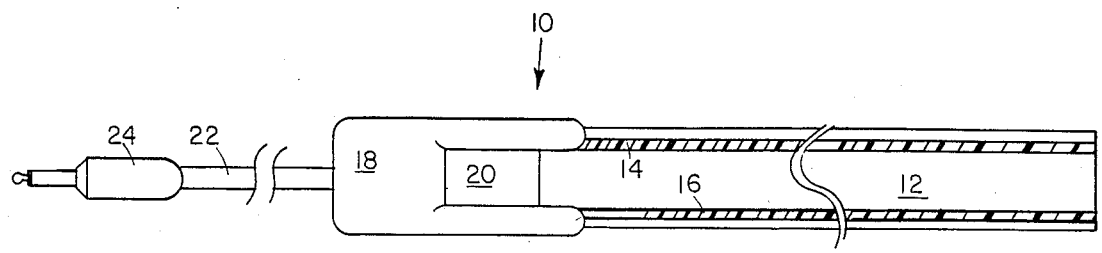
FIG. 1 is a plan view of the sensor strip device.

The preferred embodiment of the present invention is illustrated by way of example in FIGS. 1-8. With specific reference to FIG. 1, moisture sensing strip 10 is illustrated which includes non conductive extruded insulating sensor strip 12 and oppositely positioned non-metallic conductors 14 and 16. Molded yoke 18 is shown as securely attached to sensor strip 12 and the electrically isolating opening 20 is also disclosed. Shielded wire transmission cable 22 is illustrated with electrical transmission plug 24 attached.

Figure 5:
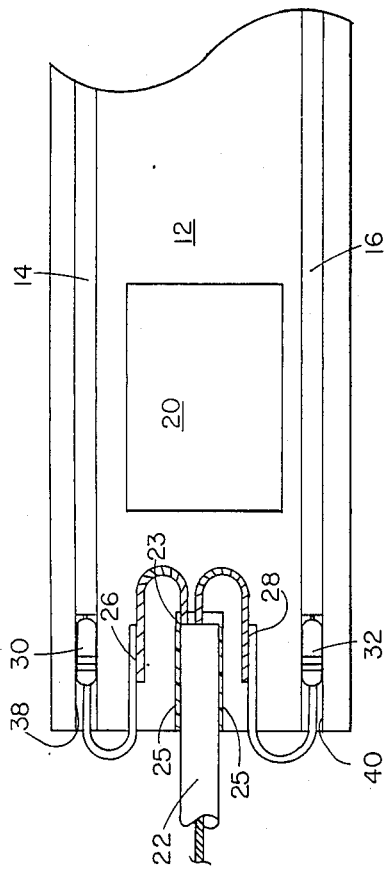
FIG. 5 is a plan view of the creation of the yoke end of the sensor strip in connection of resistors to the transmission cable shown without the yoke covering.
Figure 6:
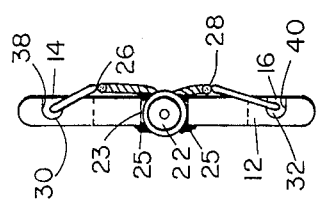
FIG. 6 is an end view of the sensor strip without the yoke covering.
Figure 7:
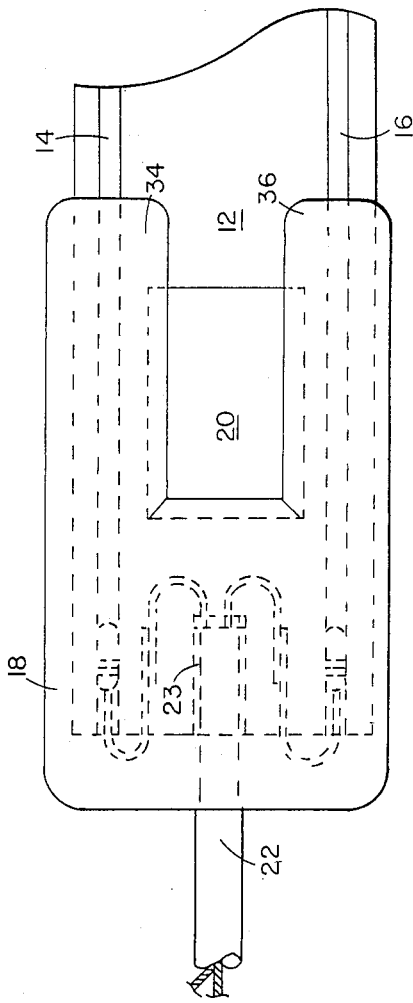
FIG. 7 is a plan view of the sensor strip and connection of resistors to the transmission cable shown in dashed lines while covered with the yoke.
Figure 8:
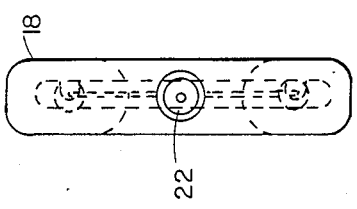
FIG. 8 is an end view of the sensor strip with the yoke in place.

Referring to FIG. 5, the creation of the yoke end of invention 10 is disclosed. To begin with, electrically isolating opening 20 is punched in snsor strip 12 between non-metallic conductors 14 and 16. Then rectangular cable opening 23 is cut into the end of sensor strip 12 and cable 22 securely attached therein by means of hot melt plastic glue 25 well known in the art shown as dashed lines. Next, shielded wire transmission cable 2 is attached at points 26 and 28 to isolation resistors 30 and 32 which are connected in turn to non-metallic conductors 14 and 16 respectively. This "attachment" consists of embedding resistors 30 and 32 in grooves 38 & 40 and connecting leads from resistors 30 and 32 into non-metallic conductors 14 and 16. Resistors 30 and 32 are of high resistance, typically 220,000 OHMS, which provide a very high impedance path for isolating the user from any possible current that might be inadvertently introduced into the shielded cable 22. An end view of FIG. 5 is shown in FIG. 6. Referring to FIG. 7, molded yoke 18 is shown securely attached so that it encapsulates sensor strip 12, connection points 26 and 28, resistors 30 and 32 and some small portion of the shielded wire transmission cable 22. As can be seen by FIG. 7, electrically isolating opening 20 in yoke 18 forces the joint between yoke 18 and sensor strip 12 to be broken into two separate loops, 34 and 36, which have no common connection where moisture can be trapped and form a non cleanable, continuous pathway for current. The presence of the electrically isolated opening 20 assures that any pathway for current must pass over either the non conductive sensor strip 12 or the non conductive smooth surface of molded yoke 18. These surfaces are obviously easy to clean and dry thereby making positive restoration of the insulating condition of the device 10 simple after use. FIG. 8 is an end view of FIG. 7.

Electrically isolating opening 20 also provides a functional location for securing an attachment of clip of ordinary design, not shown, if desired, for retention of sensor strip 12 in a selected location.

Figure 2:
FIG. 2 is an end view of the sensor strip with a pair of grooves formed therein.
Figure 3:
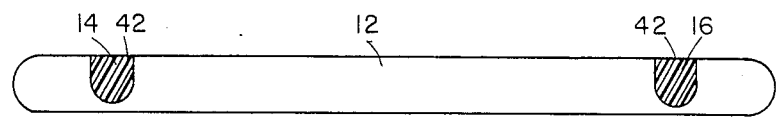
FIG. 3 is an end view of the sensor strip with a pair of non-metallic conductors sealed within the grooves in the sensor strip.

Referring to FIG. 2 device 10 is illustrated with sensor strip 12 shown from an end view. Also illustrated are oppositely positioned retaining grooves 38 and 40. These grooves 38 and 40 are specifically designed and created to physically retain non-metallic conductors 14 and 16 once the conductors 14 and 16 are placed therein. Referring to FIG. 3, conductors 14 and 16 are shown located in grooves 38 and 40 and, after heat and pressure are added, forming a smooth electrically conductive surface 42. Electrically conductive non-metallic conductors 14 and 16 are made electrically conductive by the formulation of a plastic, such as polyvinyl chloride (PVC), with microscopic particles of carbon in the form of lamp-black. An example of this material is that made currently under the trade name "Bakelite" number HFDA-0580 produced by the Union Carbide Company. Similar products are also made by other suppliers and electrically conductive material is not described further herein since material of this type is available commercially and is well known to those of ordinary skill in the art. After physically installing the non-metallic conductors 14 and 16 into a fixed parallel relationship in formed grooves 38 and 40 the sensor strip 12 is subjected to heat and pressure to seal the non-metallic conductors 14 and 16 into the surface of the sensor strip 12 thereby forming a slick smooth surface 42 without grooves or joints that might entrap moisture or electrolytes. Because non-metallic conductors 14 and 16 are exposed, by means of electrically conductive material, and because the conductors have no fragile or potentially harmful metal wires, the device is safe, easily cleaned, long lasting and durable.

Figure 4:
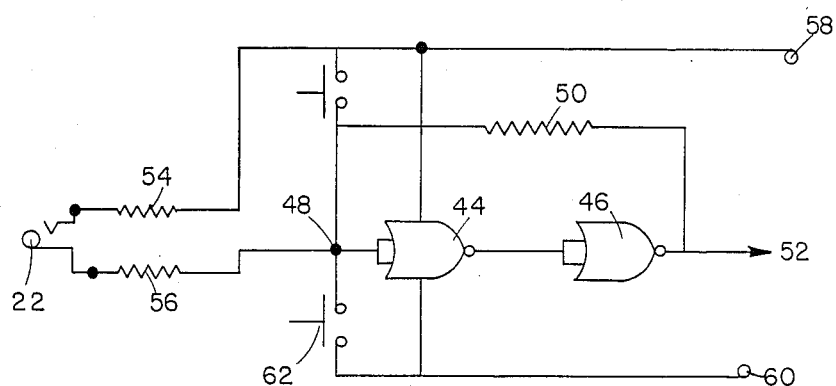
FIG. 4 is a schematic diagram illustrating a typical detector circuit to which the sensor strip is connected.

Referring to FIG. 4, a typical detector circuit is illustrated. Sensor strip 12 is not shown, although the connection to shielded cable 22 is demonstrated. The electronic circuit suitable for the alarm sensing will be familiar to anyone skilled in the electronic art. The figure shows a threshold detector consisting of two NOR gates 44 and 46 constructed from low current CMOS technology. The voltage at the input gate 48 is set by the feedback 1 Meg ohm resistor 50 from the output 52 and the resistance of the sensor strip through connector plug 24 connected through sensitivity adjustment resistors 54 and 56 to the plus battery supply 58. Initially the voltage is low at input gate 48, held down by the output 52 voltage being at the minus supply 60. When conduction occurs in the Sensor strip 12, the voltage at input 48 rises until it reaches about one half of the battery voltage. At this time the first stage 44 trips to the low output condition and the second stage 46 trips to the high output 52 condition causing input 48 to switch to the high voltage condition by means of feedback resistor 50 to the input 48. This sudden switching of voltage is a very sensitive detection point for the external resistance provided by the conduction in the electrolyte path between the non-metallic conductors 14 and 16 in the sensor strip 12. When the conduction path is removed, the threshold condition can be reset by means of the pushbutton connection 62 that connects the input 48 to the minus bus of the battery supply 60. Removing the conduction path does not reset this threshold sensor circuit.

As can be seen, invention 10 relates to a moisture or liquid electrolyte sensor that can serve to detect the presence of moisture by forming a conductive path for very small DC currents in the range of 10 microamps between parallel non-metallic conductors 14 and 16 in a construction isolated chemically and physically by electrically conductive material from the liquid conduction path. For the primary application of sensing urine, sensing strip 12 is placed in the bedding within an absorbant pad between the sensor strip 12 and the patient. Normally, the sensor has a high resistivity, such as several meg ohms, when it is dry but when electrolyte is present, the resistivity lowers to a much smaller value, such as 450K ohms. This effect can be used to trip an alarm provided the sensing circuit is adjusted, by means of sensitivity adjustment resistors 54 and 56, as illustrated in FIG. 4, to operate at the appropriate values of current in the range of 10 microamps. Such a sensing circuit is illustrated in FIG. 4 and is not discussed further herein since they are obvious to one ordinarily skilled in the art.

It is understood that the current used to operate this sensor strip 12 will be limited to safe values, in the range of 10 microamps, as described in the American Association of Medical Instruments standard number SCL12/79 and the design requirements for Nurse Call Systems promulgated by the Underwriters Laboratory, 1069, hereby incorporated by reference. In addition, it is most important for the sensor 12 to be easily installed, comfortable to the patient and be easily cleaned and dried. Because of the combination of molded yoke 18 and electrically isolating opening 20, a continuous joint is absolutely avoided. Instead, two separate loops 34 and 36 are provided and the "rearming" of the strip is easily accomplished by simply wiping the sensor strip 12 and the molded yoke 18 dry.

As described, the present invention has as its main objective the care of elderly patients who have lost control of certain bodily functions and will likely never regain such control again. The sensor 12, in conjunction with the appropriate electronic system, provides an alarm for professional nurses and other attendants given charge of elderly patient care. Many other applications of this invention are obvious. For instance, another application for this invention is the sensing of liquid levels in storage tanks. For this use the sensor strip 12 is suspended vertically such that when the liquid level changes, the amount of the strip exposed to the electrolyte changes, thus altering the amount of conductivity. Still another application of the invention is the sensing of the presence of other electrolytes that might be spilled on the floor. Because of its unique construction, flexibility and lack of potentially harmful wires, the invention can even be used in wheel chairs and other places where the patient actually sits on the device.

Further, it is obvious that sensor strip 12 and non-metallic conductors 14 and 16 could be formed together in one step, by currently available injection molding processes, thereby eliminating the necessity of forming grooves 38 and 40.

While the present invention has been disclosed in connection with the preferred embodiment thereof, it should be understood that there may be other embodiments which fall within the spirit and scope of the invention as defined by the following claims.

What is claimed is:

1. An isolated molded sensor strip comprising:
  A. an extruded, flexible, electrically insulating sensor strip with a pair of oppositely positioned retaining grooves formed therein;
  B. a pair of oppositely positioned non-metallic conductors fusedly secured to said sensor inserted into said oppositely positioned retaining grooves and fusedly secured therein by the application of heat and pressure so that a solid, smooth surface without grooves is provided;
  C. an isolating yoke means which ensures complete electrical isolation of said pair of non-metallic conductors by means of an opening in said thin, flexible extruded sensor strip between said pair of non-metallic conductors;
  D. said yoke means which seals the ends of said pair of non-metallic conductors so that a joint between said yoke and said sensor strip provides a non-continuous path around said opening between said pair of non-metallic conductors;
  E. a connection between both of said oppositely positioned non-metallic conductors and a pair of isolation resistors, each with two leads extending therefrom, by insertion of one pair of said leads from said isolation resistors into said non-metallic conductors;
  F. a connection of said pair of isolation resistors with one end of said shielded wire transmission means by joining the other pair of said leads from said isolation resistors to one end of said shielded wire transmission means;
  G. a total sealing of said shielded wire transmission means and said isolation resistors by said isolating yoke means by way of being pressure formed around said connection of said resistors and said transmission means at the place where said transmission means passes out of said yoke means; and
  H. an electronic transmission plug attached to the opposite end of said shielded transmission means so that said transmission plug may be connected to a detection alarm system so that the presence of said electrical signals is detected.

2. An isolated molded sensor strip comprising:
  A. a thin, flexible, extruded insulating sensor strip with a pair of oppositely positioned retaining grooves formed therein;
  B. a pair of non-metallic conductors composed of an electrically conductive plastic means wherein said pair of non-metallic conductors are inserted into said oppositely positioned retaining grooves and fusedly secured therein by the application of heat and pressure so that a solid, smooth surface without grooves is provided and so that said non-metallic conductors transmit electric signals when generated by the presence of an electrolyte;
  C. an opening, near one end, in said thin, flexible, extruded sensor strip between said pair of non-metallic conductors;
  D. a yoke means which seals the ends of said pair of non-metallic conductors so that a joint between said yoke and said sensor strip provides a non-continuous path around said opening between said pair of non-metallic conductors;
  E. A connection between both of said oppositely positioned non-metallic conductors and a pair of isolation resistors, each with two leads extending therefrom, by insertion of one pair of said leads from said isolation resistors into said non-metallic conductor;
  F. a connection of said pair of isolation resistors with one end of a shielded wire transmission means by joining the other pair of said leads from said isolation resistors to one end of said shielded wire transmission means;
  G. a total sealing of said shielded wire transmission means and said isolation resistors by said isolating yoke means by way of being pressure formed around said connection of said resistors with said transmission means at the place where said transmission means passes out of said yoke means;

H. the attachment of an electronic transmission plug to the opposite end of said shielded transmission means so that said transmission plug may be connected to a detection alarm system; and I. a detection alarm system connected by means of said electronic transmission plug to said shielded wire so that the presence of electronic signals generated by the presence of said electrolyte on said non-metallic conductors is detected.

3. The isolated molded sensor strip of claim 2 wherein said resistors are of a high resistance, so that a very high impedance path is provided whereby an user is isolated from any possible current that might be inadvertently introduced into said shielded transmission means.

4. The method of providing an isolated molded sensor strip comprising the steps of:

A. forming a pair of oppositely positioned retaining grooves in a thin, flexible, extruded insulating sensor strip;

B. providing a pair of non-metallic conductive means;

C. inserting said pair of non-metallic conductive means in said oppositely positioned retaining grooves;

D. fusing said non-metallic conductive means in said oppositely positioned retaining grooves by the application of heat and pressure so that a solid, smooth surface without grooves is provided;

E. introducing an opening, near one end, in said thin, flexible, extruded insulating sensor strip in between said pair of non-metallic conductive means;

F. sealing the end of said sensor strip with a yoke means so that a joint between said yoke means and said sensor strip provides a non-continuous path around said opening between said pair of non-metallic conductive means;

G. connecting both of said oppositely positioned non-metallic conductors and a pair of isolation resistors, each with two leads extending therefrom, by insertion of one pair of said leads from said isolation resistors into said non-metallic conductors;

H. connecting said pair of isolation resistors with one end of a shielded wire transmission means by joining the other pair of said leads from said isolation resistors to one end of said shielded wire transmission means;

I. sealing said shielded wire transmission means and said isolation resistors within said isolating yoke means by pressure forming said yoke means around said connection of said resistors and said transmission means at the place where said transmission means passes out of said yoke means;

J. attaching an electronic transmission plug to the opposite end of said shielded transmission means so that said transmission plug may be connected to a detection alarm system;

K. connecting said shielded transmission means by means of said transmission plug to said detection alarm system so that the presence of electric signals generated by the presence of an electrolyte is detected.

* * * * *